United States Patent
Groner et al.

(10) Patent No.: US 7,934,589 B2
(45) Date of Patent: May 3, 2011

(54) FOUNDATION BRAKE HILL START AIDE SYSTEM

(75) Inventors: Shane Groner, Plainwell, MI (US); James M. Walker, Kalamazoo, MI (US); Leon Duo, Portage, MI (US); Marcell Amsallen, Angola, IN (US); Ben Karrer, Kalamazoo, MI (US); Gerard Devito, Plainwell, MI (US)

(73) Assignee: Eaton Corporation, Cleveland, OH (US)

( * ) Notice: Subject to any disclaimer, the term of this patent is extended or adjusted under 35 U.S.C. 154(b) by 534 days.

(21) Appl. No.: 12/018,876

(22) Filed: Jan. 24, 2008

(65) Prior Publication Data

US 2009/0192019 A1    Jul. 30, 2009

(51) Int. Cl.
 *B60T 8/24* (2006.01)
 *B60T 8/171* (2006.01)
(52) U.S. Cl. ............ 192/219.1; 303/89; 701/70
(58) Field of Classification Search .......... 192/219.1; 303/192
 See application file for complete search history.

(56) References Cited

U.S. PATENT DOCUMENTS

| | | | |
|---|---|---|---|
| 4,076,093 A | 2/1978 | Mizuno et al. |
| 4,629,043 A | 12/1986 | Matsuo et al. |
| 4,650,046 A | 3/1987 | Parsons et al. |
| 4,681,196 A | 7/1987 | Fulmer et al. |
| 4,684,177 A | 8/1987 | Ha |
| 5,129,496 A | 7/1992 | Sigl et al. |
| 5,137,127 A | 8/1992 | Braun |
| 5,484,044 A | 1/1996 | Bursteinas et al. |
| 5,979,619 A | 11/1999 | Rump et al. |
| 5,984,429 A | 11/1999 | Nell et al. |
| 6,009,984 A | 1/2000 | Zechmann et al. |
| 6,056,373 A | 5/2000 | Zechmann et al. |
| 6,086,515 A | 7/2000 | Buschmann et al. |
| 6,193,332 B1 | 2/2001 | Ono et al. |

(Continued)

FOREIGN PATENT DOCUMENTS

DE    102004062811    6/2006

(Continued)

OTHER PUBLICATIONS

English abstract for DE-102004062811.
European search report for EP-2082933.

*Primary Examiner* — Richard M. Lorence
(74) *Attorney, Agent, or Firm* — Rader, Fishman & Grauer PLLC

(57) ABSTRACT

An exemplary embodiment of a Hill Start Aide system for a vehicle includes a brake system. The brake system including a brake actuator for manually actuating the brake system. The brake system is selectively configurable in a stopped configuration, where the brake system is manually maintained via the brake actuator such that a vehicle road wheel speed is about zero rpm, a released configuration, where the brake system will not generally inhibit rotation of at least one vehicle road wheel, and a control stop configuration, where the vehicle road wheel speed is about zero rpm. The Hill Start Aide system also includes a controller for at least partially controlling the brake system. The controller will selectively send a signal to maintain the brake system in the control stopped configuration when the brake actuator is manually released. The controller will send a signal to the brake system to release the brakes when a predetermined amount of time has elapsed after a transmission is manually shifted to a neutral configuration while the brake system is in the control stopped configuration.

16 Claims, 3 Drawing Sheets

U.S. PATENT DOCUMENTS

| | | |
|---|---|---|
| 6,199,964 B1 | 3/2001 | Ota et al. |
| 6,364,436 B1 | 4/2002 | Sawada et al. |
| 6,411,881 B1 | 6/2002 | Thomas |
| 6,439,675 B1 | 8/2002 | Zechmann et al. |
| 6,527,076 B1 * | 3/2003 | Polzin .................... 180/170 |
| 6,644,454 B2 * | 11/2003 | Yamada et al. ............ 192/219.1 |
| 6,748,311 B1 * | 6/2004 | Walenty et al. ................. 701/70 |
| 2005/0246081 A1 | 11/2005 | Bonnet et al. |
| 2007/0096557 A1 | 5/2007 | Tamai et al. |
| 2007/0114841 A1 | 5/2007 | Maruyama et al. |

FOREIGN PATENT DOCUMENTS

| | | |
|---|---|---|
| DE | 102006044884 | 4/2007 |
| GB | 2314596 | 1/1998 |

* cited by examiner

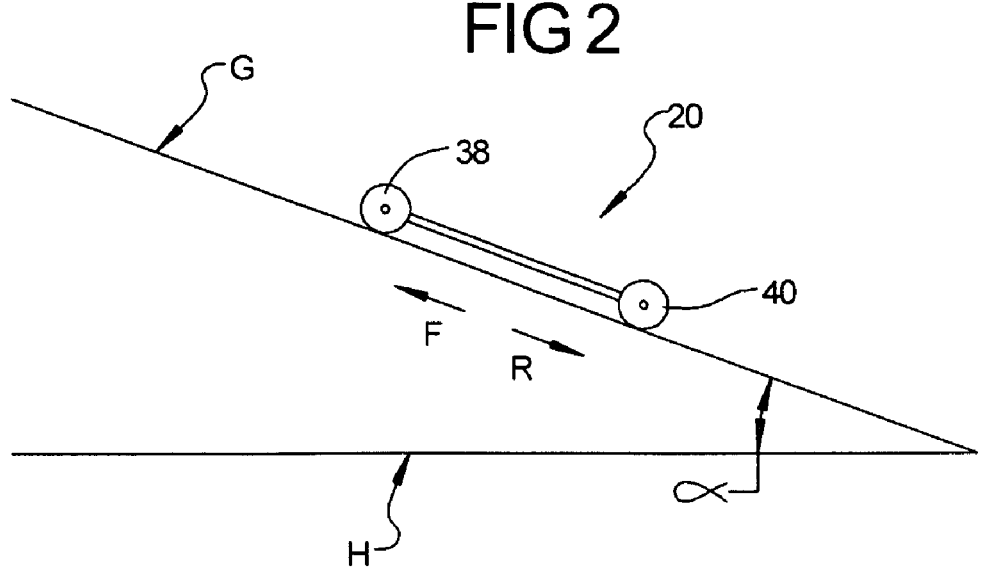
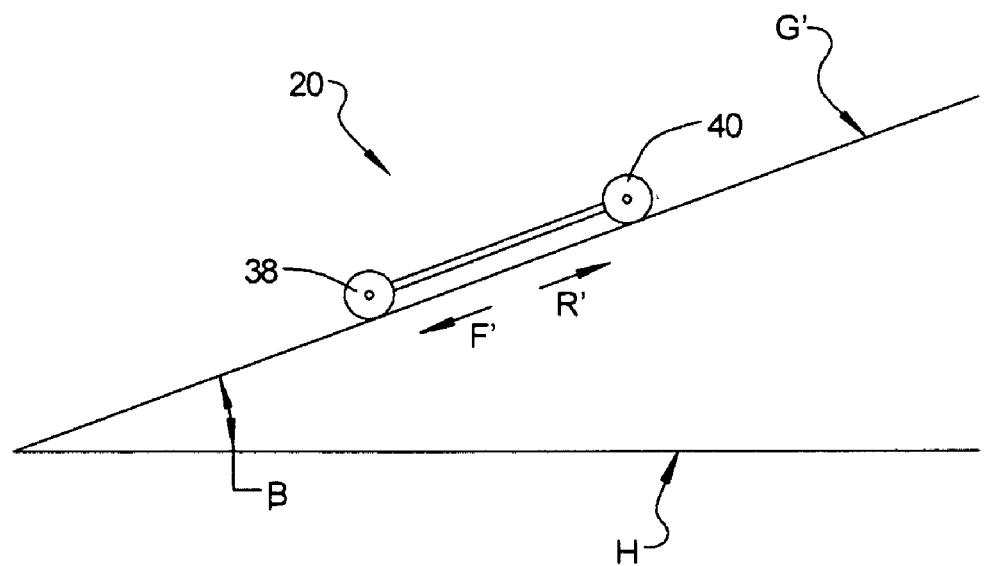

US 7,934,589 B2

FOUNDATION BRAKE HILL START AIDE SYSTEM

TECHNICAL FIELD

The disclosure generally relates to Hill Start Aide systems for vehicles.

BACKGROUND

A variety of Hill Start Aide systems have been proposed in the past to automatically maintain a vehicle brake when the vehicle is located on a hill as the vehicle is traveling below some predetermined minimum speed value. Typical Hill Start Aide systems will maintain the vehicle stationary while the vehicle is on a grade to permit the vehicle operator to start the vehicle in a desired direction of travel while preventing the vehicle from rolling in the opposite direction. Hill Start Aide systems can be of particular advantage to a vehicle driver in instances where the vehicle is a truck carrying a heavy load and undesired rolling in the direction opposite the desired direction may overstress the vehicle drive train to overcome the inertia of vehicle movement. Many Hill Start Aide systems include a variety of inputs for actuating and deactivating the system.

One example of a motor vehicle Hill Start Aiding system is disclosed in commonly owned U.S. Pat. No. 5,137,127, to Braun, the disclosure of which is incorporated herein by reference in its entirety. Many Hill Start Aide systems operate to maintain a hydraulic pressure within vehicle brake lines that supply fluid pressure to wheel cylinders for slowing and/or stopping vehicle road wheels that contact the ground.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

FIG. 2 is a schematic illustration of a vehicle incorporating a Hill Start Aide system, according to an embodiment.

FIG. 3 is a schematic illustration of a vehicle incorporating a Hill Start Aide system, according to an embodiment.

DETAILED DESCRIPTION

Figure 1:
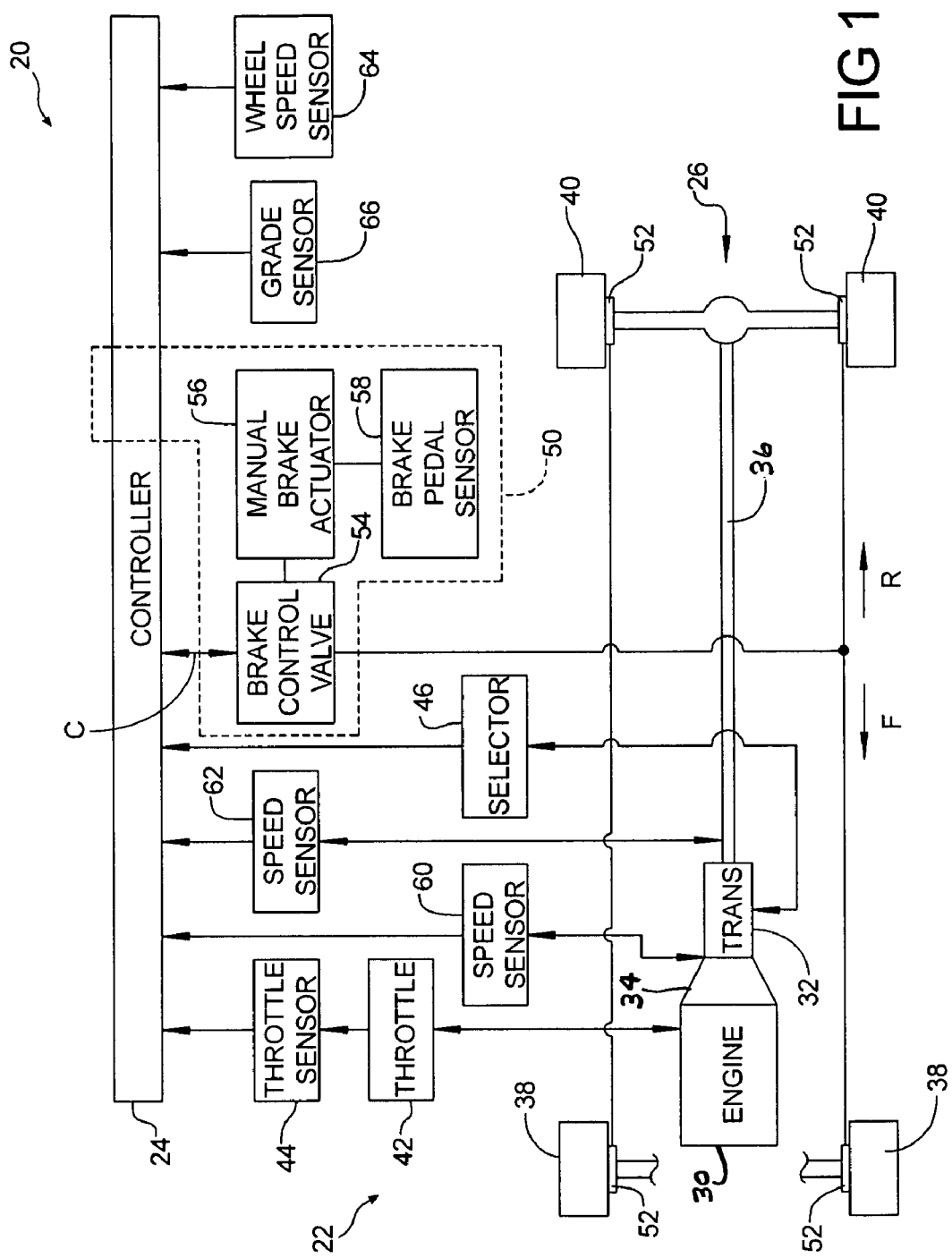
FIG. 1 is a schematic illustration of a Hill Start Aide system, according to an embodiment.

FIG. 1 schematically illustrates a vehicle 20. The vehicle 20 includes a Hill Start Aide system, illustrated schematically at 22, a controller 24, and a drivetrain 26. The drivetrain 26 includes an engine 30, a transmission 32, a clutch 34, a torque transmission system 36, front wheels 38, and rear drive wheels 40. The controller 24 may be a dedicated Hill Start Aide controller or may be adapted for additional functions including, for example, engine and/or transmission control.

The rotational speed of the engine 30 is controlled by a throttle 42 whose position is sensed by throttle sensor 44. The engine 30 is operatively connected to the transmission 32 by the clutch 34. The engine 30 is operative to rotate at least a portion of the torque transmission system 36 and the drive wheels 40 when clutched to the transmission 32 and the rotary speed and direction of rear drive wheels 40 is dictated by the gear combination selected by a gear selector 46. The gear selector may be manual or may include an actuator mechanism that controls the transmission 32. In the exemplary embodiment illustrated, the controller 24 is in communication with the transmission, through the selector 46, and can determine whether the transmission 32 is in a neutral gear. That is, the controller can sense an input to determine whether the wheels 40 will be restricted from rotating by portions of the transmission 32.

The Hill Start Aide system 22 also includes a brake switch and a brake system, illustrated generally at 50. The brake system 50 includes wheel brakes 52, a brake control valve 54, a manual brake actuator 56, and a brake position sensor 58. In the exemplary embodiment illustrated, the wheel brakes 52 are the foundation brakes of a light to heavy duty truck. The brake position sensor 58 is operative to provide a signal indicating whether the vehicle brakes 52 are in an engaged or disengaged condition (whether the manual brake actuator 56 is actuated or released).

In the embodiment illustrated, the brake switch 48 is a manual switch operated by the driver that enables the Hill Start Aide system 22 to be enabled such that the brakes 52 may remain actuated after the manual brake actuator 56 is released, as discussed in greater detail below. In other embodiments, the brake switch may be automatically actuated by a controller, such as the controller 24, or may be controlled by the driver.

The Hill Start Aide system 22 also includes at least one speed sensor operative to sense and provide a signal indicative of a selected speed condition such as one or more of ground speed, engine speed, change in ground speed, and change in engine speed. Ground speed can be deduced, for example, from either a transmission input speed sensor 60, a wheel speed sensor 64, or a transmission output speed sensor 62.

The system 22 also includes a wheel speed sensor 64, and a grade sensor 66. While the vehicle 20 is illustrated as including one controller 24, the vehicle 20 may include any number of controllers including dedicated controllers for the brake system 50 and the Hill Start Aide system 22. The wheel speed sensor 64 may send a signal to the controller 24 indicative of whether a wheel 38, 40 is rotating and the speed of rotation.

The grade sensor 66 indicates whether the wheels 38, 40 will rotate (whether the vehicle 20 will move) when the brakes 52 are released. If the vehicle is on a completely flat, level surface, the wheels 38, 40 will not tend to rotate when the brakes 52 are released. Since an uneven surface may result in rotation of the wheels 38, 40 when a grade sensor 66 detects a level surface, the grade sensor may include sensors that detect whether the wheels 38, 40 are urged to move in addition to, or in lieu of a sensor that detects the elevation of the surface at wheels 38, 40.

In the exemplary embodiment illustrated, the wheel brakes 52 are operated by pressurized fluid such as air or a suitable brake fluid that is conveyed under pressure from the brake control valve 54 to respective wheel brake cylinders (not shown) that are mechanically linked to the brakes and operative to move the brakes into engagement when pressurized as is well known to those skilled in the art of vehicle brakes.

Referring to FIG. 2, the wheels 38, 40 contact the ground G and may be rotated by the engine 30. The grade sensor 66 (FIG. 1) detects the angle of incline α of the vehicle 20. That is, the grade sensor 66 sends an input to the controller 24 that is indicative of whether the front wheels 38 are higher in altitude from a horizontal plane H than the rear drive wheels 40. The controller 24 may use this input from the grade sensor 66 to assume that the vehicle 20 will tend to move in the general direction of the arrow R when the brakes 52 are released.

Referring to FIG. 3, the wheels 38, 40 contact the ground G' and the grade sensor 66 (FIG. 1) detects the angle of incline β of the vehicle 20. That is, the grade sensor 66 senses an input to the controller 24 that is indicative of whether the front wheels 38 are lower in altitude from a horizontal plane H than the rear drive wheels 40. The controller 24 may use this input from the grade sensor 66 to assume that the vehicle 20 will tend to move in the general direction of the arrow F' when the brakes 52 are released.

Generally, if the front wheels 38 are higher in altitude from a horizontal plane H than the rear drive wheels 40, the vehicle 20 is on a positive grade, and if front wheels 38 are lower in altitude from a horizontal plane H than the rear drive wheels 40, the vehicle 20 is on a negative grade. The grade sensor 66 may detect the presence of a grade, or may sense a value indicative of the amount of grade.

A control signal C is an output signal provided by controller 24 shown in FIG. 1. Control signal C may be an electrical signal that is delivered to the brake control valve 54. The brake control valve 54 may be an electrical solenoid actuated valve that receives control signal C and is operable to close the valve 54 when, for example, the vehicle speed is below a predetermined value such as 3 miles per hour. Brake valve 54 may receive pressurized fluid from a supply (not shown) and, while pressure is unable to bleed off of the brake cylinders (not shown) of brakes 52 and the brakes 52 remain in the engaged condition regardless of whether the operator releases the manual brake actuator 56.

The Hill Start Aide system 22 may sense a change in one or more selected drivetrain 26 conditions, such as clutch and or throttle positions, in combination with the selected speed condition signal as information to be processed by the controller 24. The Hill Start Aide system 22 may then be effective such that the control signal C may be operative to instruct control valve 54 to disengage the brakes 52 when a speed condition signal has increased sufficiently to reach the predetermined value such as when the throttle is advanced or the clutch is engaged while the speed signal is below the predetermined value. That is, when the driver desires to move the vehicle 20, the system 22 will detect that the vehicle 20 has begun to move and release the brakes 52 at a desired moment, such as when sufficient speed is reached or when sufficient torque is transmitted to the drivetrain 26 from the engine 30. Accordingly, the system 22 may maintain the vehicle 20 in a stopped configuration (via, for example, brakes such as brakes 52) after the manual brake actuator 56 has been released, and then release the brakes when the driver desires to move the vehicle 20 (either by coasting the vehicle 20 or by using the drivetrain 26 to move the vehicle uphill.

Table 1 presents an exemplary logic summary for the Hill Start Aide system 22. Specifically. Table 1 illustrates the output command of the Hill Start Aide system 22 to the brake system 50 during sensed vehicle operational conditions.

Hill Start Aide Logic Table

TABLE 1

| Grade | Wheel Speed | Commanded Direction | Hill Start Aide Command |
|---|---|---|---|
| Positive | 0 | Forward Gear | Apply |
| Negative | 0 | Forward Gear | Release |

TABLE 1-continued

| Grade | Wheel Speed | Commanded Direction | Hill Start Aide Command |
|---|---|---|---|
| 0% | 0 | Forward Gear | Apply |
| 0% | Greater Than 0 | Forward Gear | Release |
| Positive | Greater Than 0 | Forward Gear | Release |
| Negative | Greater Than 0 | Forward Gear | Release |
| Positive | 0 | Reverse Gear | Release |
| Negative | 0 | Reverse Gear | Apply |
| Positive | Greater Than 0 | Reverse Gear | Release |
| Negative | Greater Than 0 | Reverse Gear | Release |
| 0% | 0 | Reverse Gear | Apply |
| 0% | Greater Than 0 | Reverse Gear | Release |
| Positive | 0 | Neutral | Release |
| Negative | 0 | Neutral | Release |
| Positive | Greater Than 0 | Neutral | Release |
| Negative | Greater Than 0 | Neutral | Release |
| 0% | 0 | Neutral | Release |
| 0% | Greater than 0 | Neutral | Release |
| Positive | 0 | Shifting to Neutral | Release after 3 seconds |
| Negative | 0 | Shifting to Neutral | Release after 3 seconds |
| Positive | Greater Than 0 | Shifting to Neutral | Release |
| Negative | Greater Than 0 | Shifting to Neutral | Release |
| 0% | 0 | Shifting to Neutral | Release after programmable time, (default may be 3 seconds) |
| 0% | Greater Than 0 | Shifting to Neutral | Release after programmable time, (default may be 3 seconds) |

In the description of Table 1, the command to release may be an actual command from the controller 24 to release the brakes 52, or may be the absence of a command to actuate brakes 52 when the manual brake actuator 56 is released. Also, the vehicle 20 is on a Zero Percent Grade or neutral grade based upon a sensor, such as the grade sensor 66, which indicates whether the vehicle 20 will not tend to move when the brakes 52 are released.

Briefly, in one exemplary embodiment, the Hill Start Aide system 22, if actuated, disengages a brake 52 three seconds after the transmission 32 is shifted into neutral. That is, when the Hill Start Aide system 22 has been actuated (brake system 50 in a control stopped configuration) the brakes 52 will prevent at least one of the wheels 38, 40 from rotating. When the transmission 32 is later shifted into neutral, the Hill Start Aide system 22 will release the brakes 52 (brake system 50 in a released configuration) after three seconds.

In another exemplary embodiment, the Hill Start Aide system 22 may not engage the brakes 52 when a driver desires to release the manual brake actuator 56 and coast downhill, for example, either when the vehicle is on a positive grade (pointed uphill) and the transmission 32 in reverse, or on a negative grade and the transmission 32 in a forward gear, when the manual brake actuator 56 is released, as seen in Table 1, the Hill Start Aide system 22 will not actuate the brakes 52 to prevent the wheels 40 from rotating.

Figure 4:
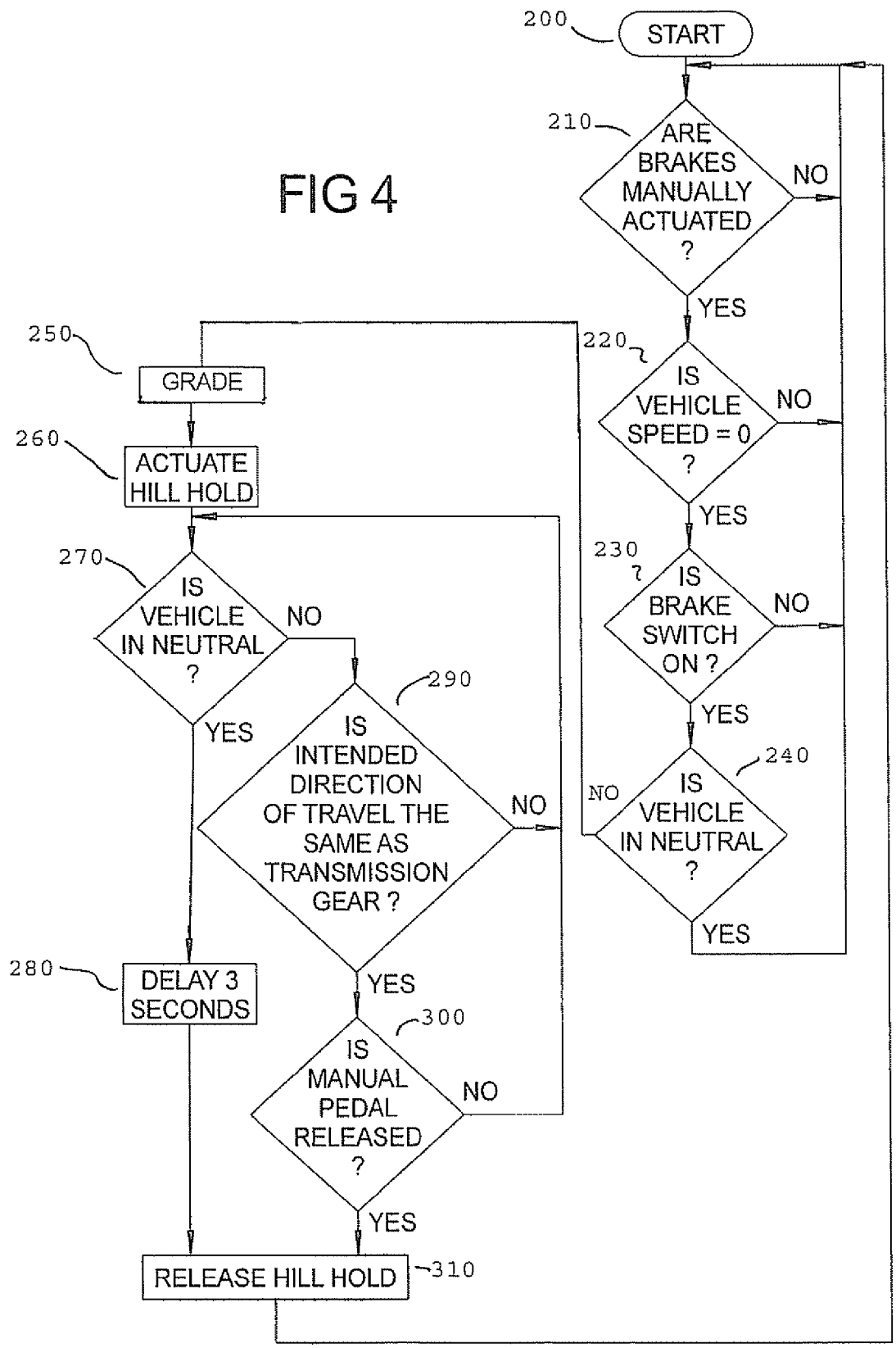
FIG. 4 is a flow chart illustrating steps of a method according to an embodiment.

With reference to FIG. 4, one exemplary embodiment of operation of the Hill Start Aide system 22 is illustrated. In Step 200, the Hill Start Aide system 22 is enabled. That is, for example, the logic steps of FIG. 4 are initiated as the controller 24 detects inputs from various sensors.

In Step 210, the system 22 determines whether the brakes 52 are manually actuated by the manual brake actuator 56. If the determination of Step 210 is positive the system 22 logic proceeds to Step 220. If the determination of Step 210 is negative, the system 22 logic returns to Step 210.

In Step 220, the system 22 determines whether the vehicle 20 speed is about zero. In the exemplary embodiment of this determination, an input from the wheel speed sensor 64 is sensed. The vehicle 20 speed may be zero, or may be some value that is close to zero, or the wheel 38 or wheel 40 speed may be some tolerance within zero rotations per minute (rpm). If the determination of Step 220 is positive, the system 22 logic proceeds to Step 230. If the determination of Step 220 is negative, the system 22 logic returns to Step 210.

In Step 230, the system 22 determines whether the brake switch 48 is on. When the brake switch 48 is on, the Hill Start Aide system 22 is enabled such that the brakes 52 may remain actuated after the manual brake actuator 56 is released, when the brake switch is off, the brakes 52 will not remain actuated after the manual brake actuator 56 is released. If the determination of Step 230 is positive, the system 22 logic proceeds to Step 240. If the determination of Step 230 is negative, the system 22 logic returns to Step 210.

In Step 240, the system 22 determines whether the transmission 32 is in a neutral gear. That is, the system 22 determines whether the wheels 40 will be permitted to rotate if the manual brake actuator 56 is released. If the determination of Step 240 is positive, the system 22 logic returns to Step 210. If the determination of Step 240 is negative, the system 22 logic proceeds to Step 250.

In Step 250, the system 22 determines whether the grade of the vehicle will result in the vehicle being urged in a direction generally the same as the direction of travel that the transmission 32 would dictate. That is, for example, the grade sensor 66 sends an input to the controller 24 that indicates that the front wheels 38 are higher in altitude from a horizontal plane H than the rear drive wheels 40 (vehicle will tend to move in the direction of the arrow R in FIG. 2, or positive grade), or that the vehicle is in about a zero percent grade, or that the vehicle is at a negative grade, and the system 22 logic proceeds to Step 260.

In step 260 the Hill Start Aide system 22 is actuated such that the brakes 52 will not be released when the manual brake actuator 56 is released (control stopped configuration) and the system 22 logic proceeds to Step 270. This actuation of the system 22 may involve manipulating the brake control valve 54, supplying a hydraulic and/or air pressure to the brakes 52, or may involve other suitable system 22 alterations to ensure that the brakes 52 will not be released when the manual brake actuator 56 is released.

In Step 270, the system 22 determines whether the transmission 32 is shifted such that the transmission 32 is in a neutral condition. In Step 270, the system 22 detects when the transmission 32 is shifted to neutral. If the system 22 was actuated in Step 260, then Step 270 detects when the driver shifts the transmission either from a reverse gear to a forward gear or from a forward gear to a reverse gear. If the determination of Step 270 is positive, the system 22 logic proceeds to Step 280. If the determination of Step 270 is negative, the system 22 logic returns to Step 290.

In Step 280, the Hill Start Aide system 22 will delay for a programmable time period, with a default of 3 seconds, and then the system 22 logic proceeds to Step 310.

In Step 290, the system 22 determines whether the vehicle 20 is being urged in a direction of travel by the engine 30 (driver intent to move vehicle). If the determination of Step 290 is positive, the system 22 logic proceeds to Step 300. If the determination of Step 290 is negative, the system 22 logic returns to Step 270 and the system 20 maintains the brakes 52 whether the manual brake actuator 56 is actuated or released.

In Step 300, the system 22 will release the brake 52 if the manual pedal is released. That is, if the manual pedal is not released, the system 22 logic proceeds from Step 290 to Step 270, and if the manual pedal is released, then the system 22 logic proceeds to Step 310.

In Step 310, the Hill Start Aide system 22 will release the brakes 52 and then the system 22 logic returns to Step 210. During the logic flow from step 200 to Step 310, the driver may have never released the manual brake actuator 56, resulting in no need for the system 22 to maintain the vehicle in a stopped configuration. If the driver releases the manual brake actuator 56 when the system 22 logic is between Step 260 and Step 310 (when the system 22 is actuated), then the brakes 52 will be maintained in the control stopped configuration.

In a released configuration, the brake system 50 will not generally inhibit rotation of at least one vehicle road wheel 38, 40. In the braked configuration, the brake system 50 inhibits the rotation of at least one vehicle road wheel 38, 40.

In the exemplary embodiment illustrated, the Hill Start Aide system 2 maintains brake hydraulic and/or air pressure at the brakes 52 after the driver has released the manual brake actuator 56 when the vehicle 20 is stopped on an incline (FIGS. 2 and 3). When the vehicle 20 is stopped on a positive incline (the front of the vehicle is pointed uphill as in FIG. 2), and the vehicle is in a forward gear, the Hill Start Aide system 22 will maintain the brake pressure when the driver releases the manual brake actuator 56. If the driver desires to move the vehicle backward (downhill) a short distance, the driver may place the transmission in a reverse gear prior to releasing the manual brake actuator 56. While some brake systems may actuate an automatic brake system during this occurrence, the Hill Start Aide system 22, in an exemplary embodiment, will not maintain the brakes 52, thereby permitting the driver to coast the vehicle 20 downhill while not using the vehicle drivetrain 26 to urge the vehicle 20 to move. The Hill Start Aide system 22 will operate similarly with the vehicle on a negative grade and the transmission in a forward gear as the manual brake actuator 56 is released.

Although the system 22 is described herein as operable by using the brakes 52 to effect the control stopped configuration, other means may be used to maintain the vehicle 20 in a stopped condition when the manual brake actuator is manually released by the driver.

Although the steps of the method of operating the Hill Start Aide system 22 are listed in an exemplary order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps. The flow chart of FIG. 4 is illustrative as one embodiment of operating the system 99.

Additionally, many variations of selected vehicle 20 speed conditions alone or in combination with selected drivetrain 26 conditions such as either or both throttle and clutch position may be used to provide desired information for processing by a controller, such as the controller 24, to provide an output signal, such as signal C, for operating the brake system 50 under Hill Start Aiding circumstances. Thus, for example, control signal C can be used to open a brake valve exhaust port (not shown) to release the system 20.

In addition to the above, drivetrain 26 conditions such as throttle position and/or clutch position signals may be processed in combination with the speed condition signal to effect engagement or disengagement of the brakes 52 in the manner desired such as where the brakes 52 are caused to disengage when the throttle is advanced (such as, for example in Step 290) and/or the clutch 34 is engaged even through a speed condition signal is below a desired value for releasing the brakes 52.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A Hill Start Aide system for a vehicle comprising:
   a brake system including a brake actuator for manually actuating the brake system, wherein the brake system is selectively configurable in a stopped configuration, where the brake system is manually maintained via the brake actuator such that a vehicle road wheel speed is about zero rpm, a released configuration, where the brake system will not generally inhibit rotation of at least one vehicle road wheel, and a control stop configuration, where the vehicle road wheel speed is about zero rpm;
   a controller for at least partially controlling the brake system, wherein the controller will selectively send a signal to maintain the brake system in the control stopped configuration when the brake actuator is manually released, and wherein the controller will send a signal to the brake system to release the brakes when a predetermined amount of time has elapsed after a transmission is manually shifted to a neutral configuration while the brake system is in the control stopped configuration;
   a sensor for detecting a transmission intended direction of vehicle travel;
   a sensor for detecting a vehicle inclination, wherein the vehicle inclination is indicative of a vehicle propensity to move in a first direction when the vehicle brake system is in the released configuration; and
   wherein the controller is adapted to prevent the brake system from being reconfigured to the control stop configuration when the detected transmission intended direction of vehicle travel is the first direction of travel.

2. The system of claim 1, wherein the brake system will selectively operate to reduce the speed of the vehicle.

3. The system of claim 1, wherein the vehicle wheel speed will not increase when the brake system is in the control stopped configuration regardless of operator manipulation of the brake actuator.

4. The apparatus of claim 1, further comprising a neutral sensing device for detecting a transmission neutral.

5. The apparatus of claim 4, wherein the controller is adapted to prevent the brake system from being reconfigured to the control stop configuration when the neutral sensing device detects the transmission neutral.

6. A method of controlling a Hill Start Aide system for a vehicle comprising:
   detecting a vehicle inclination, wherein the vehicle inclination is indicative of a vehicle propensity to move in a first direction of vehicle travel when a vehicle brake system is not in a stopped configuration;
   detecting a transmission intended direction of vehicle travel;
   reconfiguring the brake system to a control stopped configuration when the detected transmission intended direction of vehicle travel is not the first direction of vehicle travel; and
   preventing the brake system from being reconfigured to the control stopped configuration when the detected transmission intended direction of vehicle travel is the first direction of travel.

7. The method of claim 6, wherein detecting the transmission intended direction of vehicle travel includes detecting a forward engaged gear ratio of the transmission.

8. The method of claim 6, wherein detecting the intended direction of vehicle travel includes detecting a reverse engaged gear ratio of the transmission.

9. The method of claim 6, further comprising detecting a transmission neutral, and preventing the brake system from being reconfigured to the control stopped configuration when the transmission is in one of a plurality of neutral positions.

10. The method of claim 6, wherein the brake system stopped configuration includes where a vehicle wheel speed is restricted to within a predetermined tolerance of a predetermined value.

11. The method of claim 6, wherein reconfiguring the brake system to the control stopped configuration is performed as the brake system is manually released.

12. The method of claim 6, further comprising preventing an increase in vehicle wheel speed regardless of operator manipulation of the brake actuator when the brake system is in the control stopped configuration.

13. The method of claim 6, further comprising:
   detecting a shift from a gear engaged position to at least one of a plurality of neutral positions in a transmission system;
   maintaining the brake system in the control stopped configuration where a vehicle wheel speed is restricted to within a predetermined tolerance of a predetermined value; and
   reconfiguring the brake system from the control stopped configuration to a released configuration, where the brake system will not generally inhibit rotation of at least one vehicle road wheel, when a predetermined amount of time has elapsed after the shift from the gear engaged position to the neutral position.

14. The method of claim 13, further comprising maintaining the brake system in the control stopped configuration as the brake system is manually released when the detected transmission intended direction of vehicle travel is not the first direction of vehicle travel.

15. The method of claim 13, further comprising detecting a transmission neutral, and preventing the brake system from being reconfigured to the control stopped configuration when the transmission is in one of the plurality of neutral positions.

16. The method of claim 13, further comprising preventing rotation of the at least one vehicle road wheel regardless of operator manipulation of the brake actuator when the brake system is in the control stopped configuration.

* * * * *